US007184542B2

(12) United States Patent
Sauvage et al.

(10) Patent No.: US 7,184,542 B2
(45) Date of Patent: Feb. 27, 2007

(54) DTMF TONE DETECTION

(75) Inventors: Pierre Sauvage, Notre Dame de Commiers (FR); Simon Morlat, Grenoble (FR)

(73) Assignee: Hewlett-Packard Development, L.P., Houston, TX (US)

( * ) Notice: Subject to any disclaimer, the term of this patent is extended or adjusted under 35 U.S.C. 154(b) by 178 days.

(21) Appl. No.: 10/359,628

(22) Filed: Feb. 7, 2003

(65) Prior Publication Data
US 2003/0235291 A1 Dec. 25, 2003

(30) Foreign Application Priority Data
Feb. 8, 2002 (EP) ................... 02354026

(51) Int. Cl.
*H04M 1/00* (2006.01)
(52) U.S. Cl. ..................................... 379/386; 379/372
(58) Field of Classification Search ................ 379/386, 379/372
See application file for complete search history.

(56) References Cited

U.S. PATENT DOCUMENTS

| 4,689,760 A | 8/1987 | Lee et al. ................. 370/110.3 |
| 5,119,322 A | 6/1992 | Stroobach .............. 364/724.09 |
| 5,477,465 A | 12/1995 | Zheng ........................ 364/485 |
| 5,694,466 A | 12/1997 | Xie et al. .................... 379/386 |
| 5,809,133 A | 9/1998 | Bartkowiak et al. ........ 379/386 |
| 6,229,889 B1 | 5/2001 | Cannon et al. ............. 379/386 |
| 6,763,106 B1 * | 7/2004 | Li et al. ...................... 379/386 |
| 6,771,767 B1 * | 8/2004 | Li et al. ...................... 379/386 |
| 6,850,616 B2 * | 2/2005 | Soman et al. ............... 379/386 |

OTHER PUBLICATIONS

Gay, S.L., et al., "Algorithms for Multi-Channel DTMF Detection for the WE® DSP32 Family," *ICASSP 89: Speech Processing 2, Digital Signal Processing $S_2D$*, vol. 2, pp. 1135-1137 (May 23-26, 1989).

\* cited by examiner

*Primary Examiner*—Jefferey F. Harold
(74) *Attorney, Agent, or Firm*—Ladas & Parry LLP

(57) ABSTRACT

The present invention relates to the field of tone detection and, more particularly, to the detection of dual tone multi-frequency (DTMF) tones in software based telecommunications systems. As modem telecommunications systems are becoming increasingly software based and typically require only a minimum of physical hardware, much of the necessary telecommunication functionality is now provided by software functions running on powerful computer servers. A common function which is required to be performed by telecommunications systems is that of dual tone multi-frequency (DTMF) detection. Accordingly, the present invention aims to provide an efficient software-based DTMF detection system that satisfies the ever increasing need for efficient software functions.

20 Claims, 5 Drawing Sheets

DTMF TONE DETECTION

BACKGROUND

1. Field of the Invention

The present invention relates to the field of tone detection and, more particularly, to the detection of dual tone multi-frequency (DTMF) tones in software based telecommunications systems.

2. Description of Related Art

Modern telecommunications systems are becoming increasingly software based and typically require only a minimum of physical hardware. Much of the necessary telecommunication functionality is now provided by software functions running on powerful computer servers, such the HP OpenCall Media Platform (OCMP), running on a HP UX server. The HP OCMP, for example, is capable of handling thousands of telephone calls simultaneously and provides advanced telephony services. As the migration to software-based systems continues, it is becoming increasingly desirable, to have as much as possible of the necessary functionality provided by software, systems. This brings advantages such as the ability to upgrade and update software systems without requiring changes in the underlying hardware.

However, many functions, which are efficiently handled by dedicated hardware solutions require extensive computation and processing power when performed in software systems.

In software systems, many software functions and tasks share resources provided by a single processing platform. Consequently, processing functions which require extensive computation and processor power can cause a reduction in performance of other functions and tasks running on the same platform. Accordingly, even small differences in overall processing efficiency can make a substantial difference, for example, to the number of telephone calls, which can be handled simultaneously by a telecommunications system.

Dual tone multi-frequency (DTMF) detection is a common function that is required by telecommunications systems and is one such function that requires extensive processing resources.

The use of DTMF tones has revolutionised call placing, interactive telecommunications applications and has enabled advanced services such as telephone banking, telephone ordering services, call waiting facilities, to name but a few.

DTMF tones are transmitted over the voice circuit of a telephone network and must be accurately detected and decoded by DTMF decoding equipment. Since there is no way of knowing in advance when a DTMF tone may be present in a voice signal, the voice signal must be constantly processed to detect the presence of any DTMF tones. Numerous dedicated hardware solutions exist for performing DTMF detection, such as the Holtek HT9170 tone receiver integrated circuit, and such solutions have been used for many years in conjunction with existing hardware-based telecommunication platforms.

Although the amount of processing resources required for detecting DTMF tones does not necessarily pose a problem when processing a single off-line signal, processing efficiency becomes critical in real-time telecommunications systems handling thousands of telephone calls simultaneously.

Software DTMF detection techniques are known as such, for example as disclosed in U.S. Pat. No. 5,694,466 to Xie et al. In U.S. Pat. No. 5,809,133 to Bartkowiak et al. a DTMF tone detector is disclosed which uses the Goertzel algorithm for detecting DTMF tones. Only a portion of the Goertzel algorithm is performed for each of the possible tone frequencies, and the algorithm is then continued only on a number of selected frequencies.

The present invention is directed to improving the processing efficiency required for the software detection of DTMF tones.

SUMMARY

According to a first aspect of the present invention there is provided a method of detecting a dual tone multi-frequency (DTMF) tone in an input signal, in which the input signal comprises a plurality of frames. The method comprises calculating the energy level of a first portion of a frame and determining, using the calculated energy level, the likelihood that a DTMF tone is present in the frame. A DTMF tone is then only detected in the frame when it is determined that it is likely that a DTMF tone is present in the frame.

Advantageously, the amount of processing resources required to perform such software-based DTMF detection is reduced. One effect of this is to increase the number of parallel DTMF detection routines that can be executed and hence increase the number of simultaneous calls which can be handled on a single hardware platform such as the HP OCMP platform.

The DTMF tone detection process may be performed by using the Goertzel algorithm with a plurality of different frequencies so as to detect a pair of DTMF frequencies in the frame.

When a DTMF tone is detected in a first frame, the next frame is preferably processed with the Goertzel algorithm using just the frequencies of the DTMF tone that was detected in the first frame.

The present invention may also provide that the DTMF detection process is adapted to initially determine the presence of a DTMF tone in a first selection of the frames. Only if a DTMF tone is detected in the first selection of frames is the presence of a DTMF tone detected in a second selection of the frames. The presence of a valid DTMF tone is then confirmed where the number of consecutive frames in which a DTMF tone was determined as being present exceeds a predetermined number.

The present invention may additionally provide a telecommunications system arranged to operate in accordance with a DTMF detection method as described.

According to a further aspect, there is provided an article of manufacture comprising a program storage medium having computer readable program code means embodied therein for performing a method of detecting a dual tone multi-frequency (DTMF) tone in an input signal, wherein the input signal comprises a plurality of frames. The computer readable program code means in the article of manufacture includes computer readable program code means for causing a computer to calculate the energy level of a first portion of a frame, computer readable program code means for causing a computer to determine, using the calculated energy level, the likelihood that a DTMF tone is present in the frame, and computer readable program code means for causing a computer to detect a DTMF tone in the frame when it is determined that it is likely that a DTMF tone is present in the frame.

BRIEF DESCRIPTION OF THE DRAWINGS

The invention will now be described, by way of non-limiting example, with reference to the accompanying drawings, in which.

DETAILED DESCRIPTION

Figure 1:
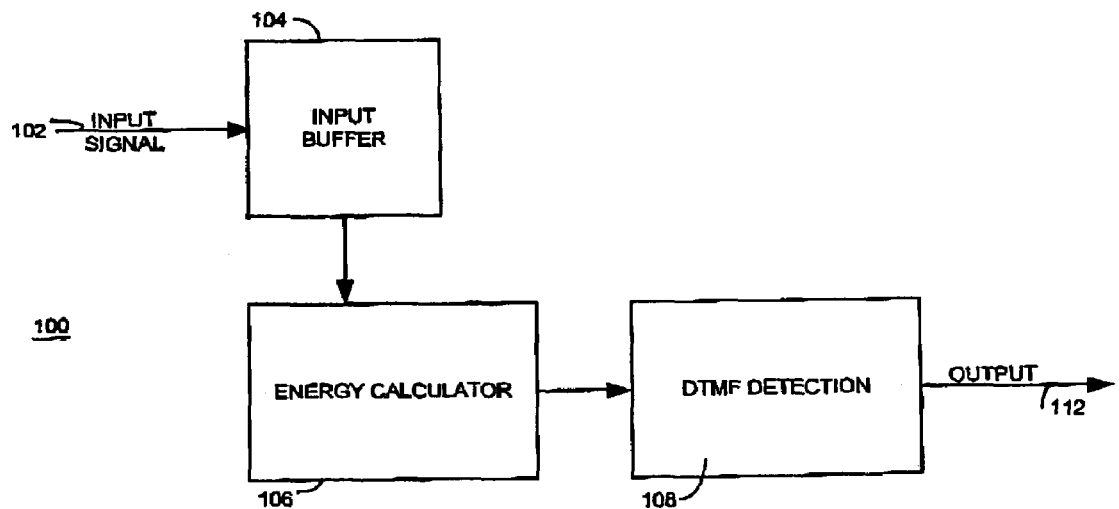
FIG. 1 is a block diagram showing the main functional blocks of a generic software-based DTMF detection system.

FIG. 1 is a block diagram showing the main functional blocks of a generic software-based DTMF detection system 100. Such a system can be implemented, for example, on a computer server or other processing platform, such as a HP UX server A digital input signal 102 comprising frames of discrete samples is received at an input buffer 104. The energy of the frame is calculated by an energy calculator 106, the output of which is fed to a DTMF detection module 108. An output 112 provides an output signal indicating the presence and nature of any detected valid DTMF tones in the input signal. The output 112 may be used to signal to other software or hardware modules the presence of detected valid DTMF tones.

As will be appreciated by those skilled in the art, a common DTMF detection algorithm for use in detecting DTMF tones is the Goertzel algorithm. The Goertzel algorithm is an infinite impulse response (IIR) filter that uses feedback to generate a very high Q bandpass filter. By analysis of the energy levels before and after processing, the presence of a given frequency can be accurately determined. In order to detect a DTMF tone it is necessary to perform the Goertzel algorithm up to eight times in order to determine which combination of the eight DTMF frequencies are present in a frame. The Goertzel algorithm is included in numerous C maths libraries, and will be well understood by those skilled in the art and thus will not be discussed in further detail herein.

Figure 2:
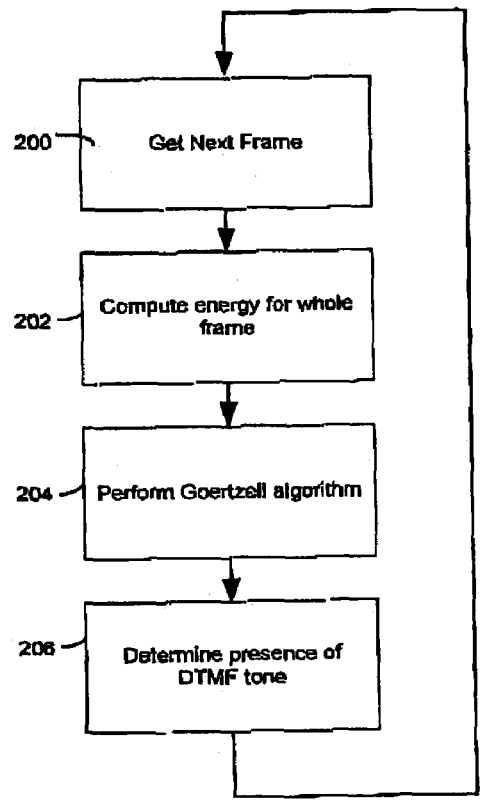
FIG. 2 is a flow diagram outlining the main functional steps in which the generic DTMF decoder of FIG. 1 is operated according to a system of the prior art.

FIG. 2 is a flow diagram outlining the main functional steps in which the generic DTMF decoder of FIG. 1 is operated according to a system of the prior art A frame of samples is removed from the input buffer 104, step 200, and the total energy for the frame is calculated, step 202. The results of the energy calculation are then used by the DTMF detection module 108, step 204. Finally, the presence of a DTMF tone is determined, step 206, using the results of the energy calculations and the Goertzel algorithm.

As previously mentioned, it is not possible to know in advance when a valid DTMF tone will be present in the input signal. The software-based DTMF detection systems of the prior art have therefore performed DTMF detection, and hence the Goertzel algorithm, on each and every frame of the input signal. One of the main drawbacks with such systems, however, is that the Goertzel algorithm is a complex algorithm that accordingly requires large of amounts of processing power. During a typical telephone call the majority of the frames will not contain a DTMF tone. Indeed, even when a telephone call is made to, for example, a voice mail server where DTMF tones are used to interact with voice menus and such like, the majority of the time is spent listening to voice responses with only a small amount of time being used to effect DTMF commands. Therefore the DTMF detection process, and particularly the Goertzel algorithm, is performed largely needlessly, using up precious processor resources.

An embodiment of the invention will now be described with reference to FIG. 3 which is a general flow diagram outlining a DTMF detection process according to a first embodiment and according to which the generic DTMF decoder of FIG. 1 may be operated.

The characteristics of DTMF tones are well known in the field of telecommunications and are defined in ITU-T recommendations Q.23 and Q.24. According to ITU-T Q.24, a valid DTMF tone has a minimum tone duration of 40 ms and a minimum detectable power level of −29 dBm. Therefore, it is possible that DTMF tones may be present in the voice signal, which are not valid DTMF tones according to the ITU-T recommendations. It should be noted that a distinction needs to be made between 'valid DTMF tones', as defined by ITU-T Q.24 and 'DTMF tones' which have been detected but which are not or which are yet to be confirmed as representing a valid DTMF tone.

In this embodiment, the input voice signal is divided into frames having a duration of 12.875 ms, with each frame containing 106 data samples. A valid DTMF tone will thus be present for the duration of at least three whole frames. Those skilled in the art will appreciate that other frame characteristics could equally be used depending on particular requirements which could result in a valid DTMF tone spanning a lesser or greater number of frames.

Figure 3:
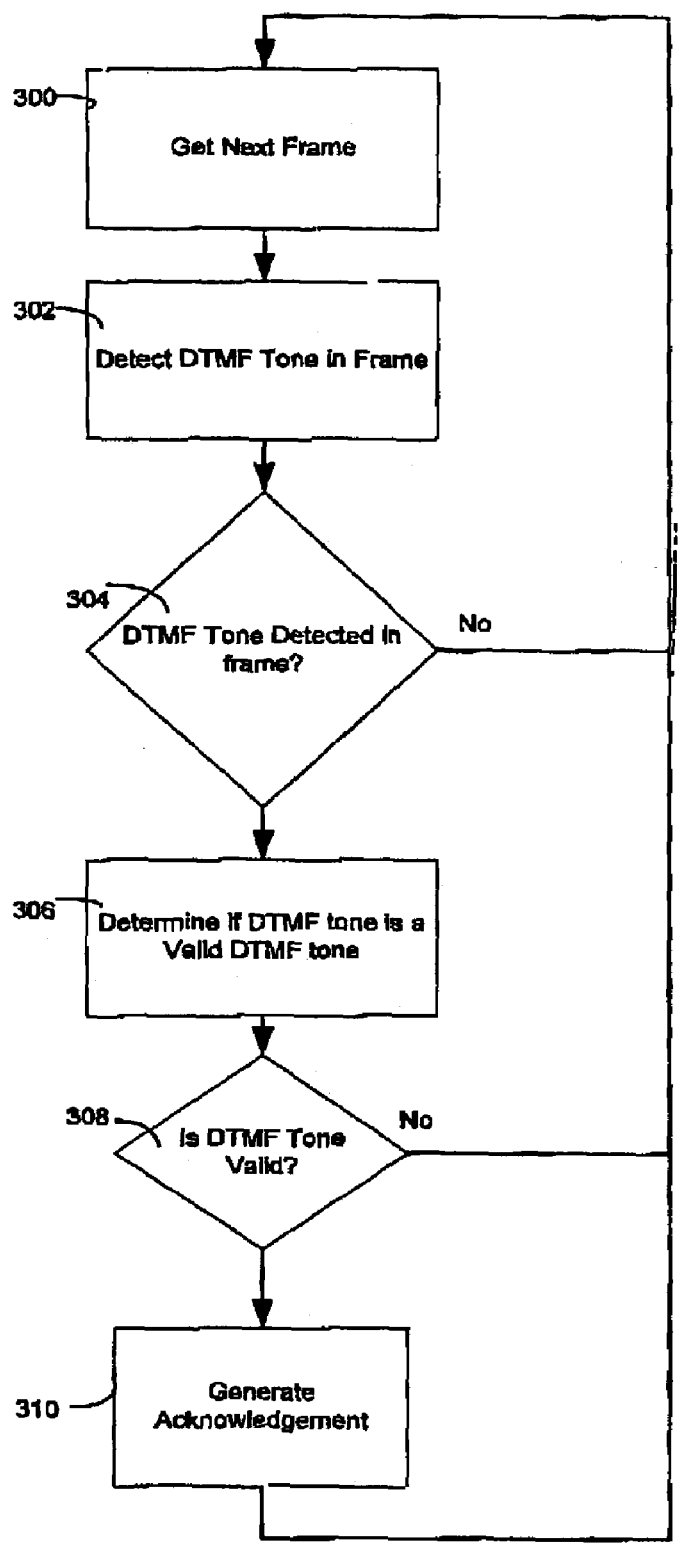
FIG. 3 is a flow diagram outlining a general DTMF detection process according to a first embodiment.

Referring now to FIG. 3, a frame of data is obtained, step 300, from the input buffer 104 of the generic DTMF detection system shown in FIG. 1. The frame is processed, step 302, to determine whether a DTMF tone is present in the frame.

If a DTMF tone is not detected, step 304, the next of frame of data is awaited for processing. If a DTMF tone was detected in the frame, step 304, it is then necessary to confirm whether a valid DTMF tone is present or not in the input signal, steps 306 and 308. Since a valid DTMF tone will span at least three whole frames, the presence of a valid DTMF tone can, for example, be confirmed once the presence the same DTMF tone in three successive frames have been confirmed. Finally, if a valid DTMF tone is determined as being present, an acknowledgement signal or message can be sent, step 310, for example to an application.

Figure 4:
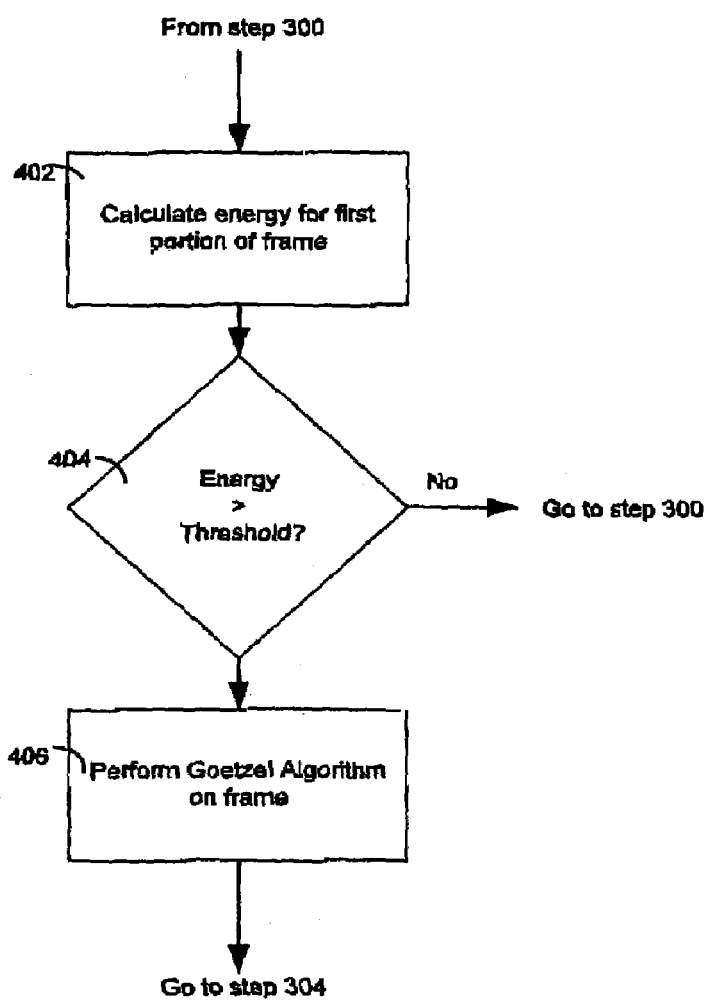
FIG. 4 is a flow diagram showing part of the DTMF detection process of FIG. 3 in greater detail.

Step 302 of FIG. 3 will now be described in greater detail with reference to FIG. 4, which is a flow diagram illustrating the DTMF detection process of step 302 in greater detail.

The energy of a first portion of the current frame is calculated, step 402, for example, by summing the squares of each sample or by any other appropriate technique as will be appreciated by those skilled in the art. The calculated energy for the first portion of the frame is compared, step 404, with a predetermined threshold to determine whether it is possible that a DTMF tone could be present in the frame. If the calculated energy level is below the threshold, it is determined that it is not possible for a DTMF tone to be present in the frame, and the next frame is retrieved for processing in the same manner. If the calculated energy level is above the threshold, this indicates the possibility that a DTMF tone may be present in the frame. In this case, further processing is required to confirm the presence of a DTMF tone in the frame. This may be achieved, for example, by performing the Goertzel algorithm on the frame, step 406.

In this way, the processor intensive Goertzel algorithm is only performed where it is determined that there is a reasonable possibility that a DTMF tone is present in a frame. This has the effect of substantially reducing the amount of unnecessary processing being performed by not performing the Goertzel algorithm on frames where it is unlikely that a DTMF tone is present.

According to the present embodiment the first portion of the frame contains 36 samples. Since the minimum detectable power level of a DTMF tone according to ITU-T Q.24 is given as −24 dBm, the predetermined threshold may be taken to be approximately 36/106ths of this level. Those skilled in the art will appreciate that variants of these values can also be used, for example depending on the number of samples in a frame.

In the present embodiment the duration of a DTMF tone in each frame is not determined; it being sufficient just to detect the presence of a DTMF tone, even if the DTMF tone has a duration of less than the length of a frame. In practice, due to the fact that most DTMF generating equipment conforms to the ITU standards, it can be assumed that transmitted DTMF tones conform to these standards. The combination of the energy calculation and the Goertzel algorithm will ensure that false detection of erroneous DTMF tones is minimized.

Figure 5:
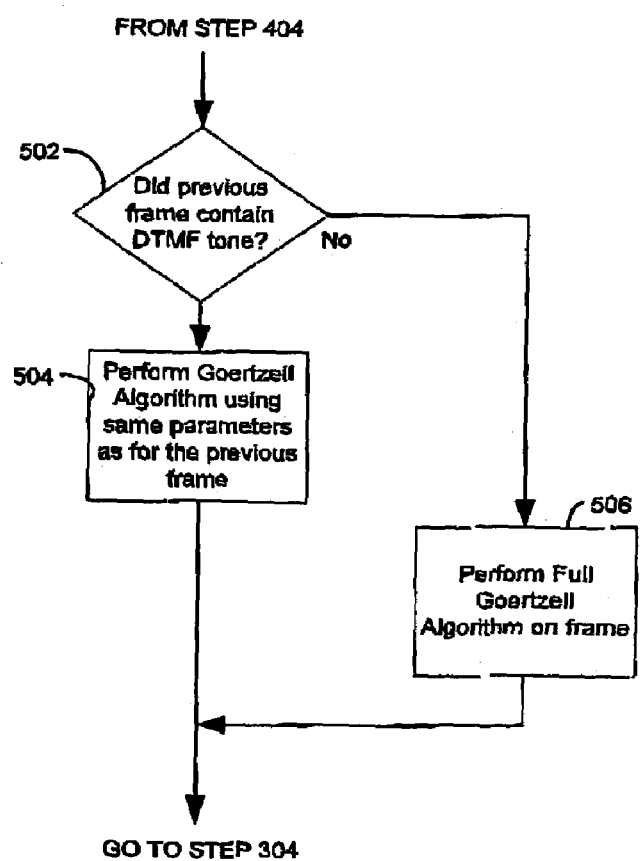
FIG. 5 is a flow diagram showing part of the DTMF detection process of FIG. 4 in greater detail.

Step 406 of FIG. 4 will now be described in greater detail with reference to FIG. 5.

As mentioned previously, a valid DTMF tone must span at least three whole frames. Therefore, if it is determined that a frame contains a DTMF tone it is likely that the subsequent frame will also contain the same DTMF tone. Through this realisation, it is possible to further reduce the processing requirements for detecting valid DTMF tones.

If it is determined that a DTMF tone is present in a frame then, when the DTMF detection is performed on the next frame, the Goertzel algorithm only needs to be performed using the same frequencies as were used to detect the DTMF tone in the previous frame. If the same DTMF tone is detected as in the previous frame, the Goertzel algorithm would have been performed using a minimal amount of processing resource, compared to using the full Goertzel algorithm. If the processing of the subsequent frame does not result in the detection of the same DTMF tone as in the previous frame the frame does not require further processing. This is due to the minimum gap that must exist between different DTMF tones.

Referring again to FIG. 5, before the Goertzel algorithm is performed on a frame, the previous frame is checked to see whether it contained a DTMF tone, step 502. If not, the full Goertzel algorithm is performed on the current frame, step 506, to detect whether a DTMF tone is present. If, however, a DTMF tone was detected as being present in the previous frame, the Goertzel algorithm is performed on the current frame using only the same pair of frequencies that were used to detect the DTMF tone in the previous frame, step 504. If the same DTMF tone is detected as in the previous frame this information can be used to establish, in step 306, whether a valid DTMF tone is present, as described above. If the same DTMF tone is not detected, the frame is not processed further as it is not possible for a valid DTMF tone to be present in the frame due to the above-mentioned minimum gap requirements, and the process reverts to step 300. This technique can yield up to a 75% saving in computation.

Further processing efficiency improvements can be made in the amount of processing required for detecting a valid DTMF tone by initially only processing a selection of the input frames.

Figure 6:
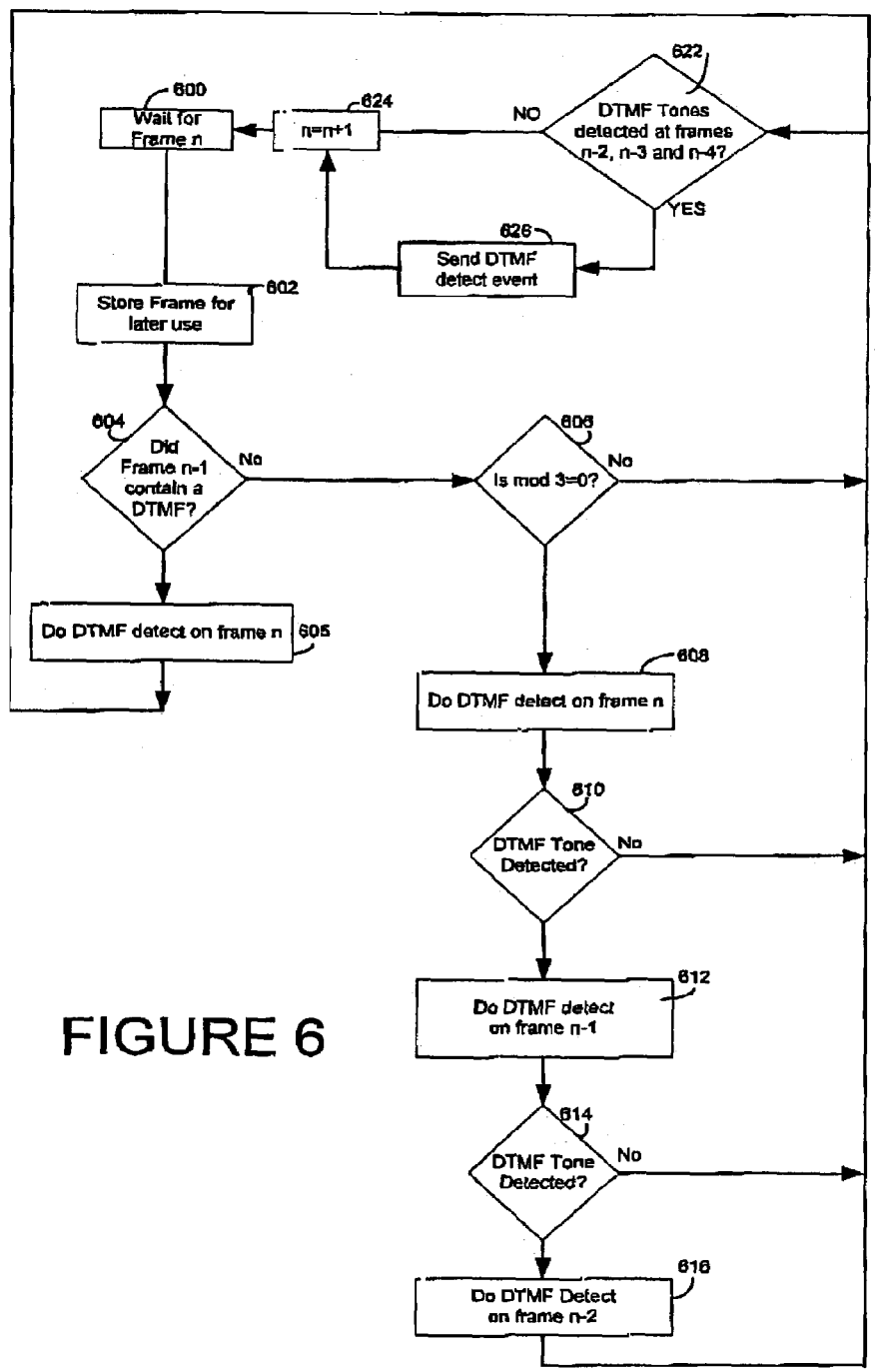
FIG. 6 is an alternative flow diagram outlining the DTMF detection according to the present invention.
Figure 7:
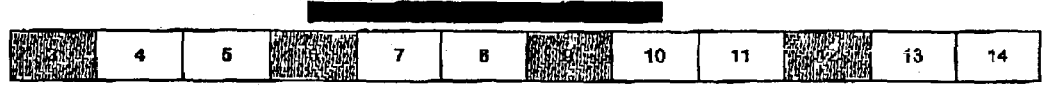
FIG. 7 is a diagram showing part of an input signal containing a valid DTMF tone.

As previously mentioned, a valid DTMF tone must span at least 3 frames. It has therefore been realised that it is not initially necessary, nor is it efficient, to perform DTMF detection on every incoming frame. Efficiency gains can be achieved by initially only processing every third incoming frame, as described below with reference to FIGS. 6 and 7. FIG. 6 is a flow diagram showing an alternative to the flow diagram shown in FIG. 3, and FIG. 7 is a diagram showing part of an input signal containing a valid DTMF tone.

A frame n is removed from a buffer, step 600, and is stored, step 602 in a temporary store. For the purpose of explanation assume that n=4. Preferably the frames are stored in a circular buffer capable of storing three frames at a time, and in which newer frames replace older frames in a cyclic manner At step 604, the status of the frame n-1, i.e. frame 3, is checked, using the DTMF detection process described above, to see whether it contained a DTMF tone. The status of recently processed frames are also stored in memory. In normal operation, as will become apparent below, frame 3 would have already been processed to detect a DTMF tone, and its status is therefore known. In this case, frame n-1 does not contain a DTMF tone. The next step, step 606, is to determine whether the number of the current frame is a multiple of 3. This ensures that, initially, only every third frame is processed. Since a valid DTMF tone must span at least three frames it is initially not necessary to process every frame. Once a DTMF tone is detected, however, further investigation is needed before confirmation of the presence of a valid DTMF tone can be given.

Since this is not the case, the status of the frames n-2, n-3 and n-4, i.e. frames 2, 1 and 0 is checked, step 622, to see whether a DTMF tone was previously detected. The reason for checking these frames is to ensure that a Valid DTMF tone is validly detected, as will be become clear below. In this case, no DTMF was detected, step 622, and the next frame is prepared for processing, steps 624, 600 and 602. The same steps are taken for n=5.

When n=6, the process arrives at step 606, where it is determined than frame 6 is one of the 'every third frames'. Accordingly, the above-described DTMF detection process is performed on frame 6, step 608, which determines that no DTMF tone was detected in frame 6.

The process continues with frames 7 and 8 as described above.

When n=9, the process continues to step 606 in the manner described above. Since frame 9 is one of the 'every third' frame, step 606, the above-described DTMF detection process, step 608, is performed on frame 9. Since frame 9 does contain a DTMF tone, step 610, a DTMF detection process, step 612, is subsequently performed on frame n-1, i.e. frame 8. Since frame 8 contains a DTMF tone, step 614, the above-described DTMF detection process is performed on frame n-2, i.e. frame 7, step 616.

At step 622, a decision is made to establish whether a valid DTMF tone has been detected. This is achieved by checking to see whether DTMF tones were detected at frames n-2, n-3 and n-4, in other words were DTMF tones present in frames 7, 6 and 5. In this case, the decision is negative, and the next frame, where n=10 is processed.

At step 604, it is determined whether frame n-1, i.e. frame 9, contained a DTMF tone, which it did. The DTMF detection process is then performed on frame 10, before the presence of a valid DTMF tone is checked at step 622. In this case, frame n-2, i.e. frame 8, did contain a DTMF tone, as did frame n-3, i.e. frame 7. However frame n-4, i.e. frame 6, did not contain a DTMF tone therefore the result is still negative.

The process continues, with n=11. At step 604, it is determined whether frame n-1, i.e. frame 10 contained a DTMF tone, which it did not. The result of step 606 is also negative. Again the presence of a valid DTMF tone is determined at step 622, by checking whether a DTMF tone was present in frame n-2, n-3 and n-4. In this case, frames 9, 8 and 7 did contain DTMF tones and it is therefore determined that a valid DTMF tone has been detected. Consequently, a DTMF start event, or other similar notification, may be issued, step 626.

The reason for delaying the acknowledgement of the presence of a DTMF tone is to ensure that the processing of the necessary frames has been performed prior to issuing a DTMF start event.

As mentioned previously, it is not deemed necessary to confirm the duration of each DTMF tone detected. In the example shown in FIG. 7 a valid DTMF tone is shown spanning 3 whole frames. As long as a DTMF tone is detected in three successive frames, a valid DTMF tone will be detected. Accordingly, a valid DTMF tone would also be (falsely) detected if a DTMF tone was present, for example, for only the first two-thirds of three consecutive frames. According to the ITU standards, such an occurrence is not a valid DTMF tone. However, for simplicity of the implementation, and due to the unlikely occurrence of such an event naturally, the present invention would still detect such an event as a valid DTMF tone.

Although the above description has been described with reference to methods for performing DTMF detection, it should be appreciated that one way in which such methods are can be provided is in the form of an article of manufacture comprising a program storage medium having computer readable program code, for example, for use on general purpose computing systems.

Those skilled in the art will appreciate that the accompanying flow diagrams are mere examples and that changes to the flow diagrams and associated methods can be made without detracting from the overall inventive nature of the embodiments described herein. For example, it will be appreciated that in FIG. 6, changes could be made to issue a DTMF start event with a smaller frame delay, depending on requirements.

The invention claimed is:

1. A method of detecting a dual tone multi-frequency (DTMF) tone in an input signal, wherein the input signal comprises a plurality of frames, comprising: calculating the energy level of a first portion of a frame; determining, using the calculated energy level, the likelihood that a DTMF tone is present in the frame; and detecting a DTMF tone in the frame when it is determined that it is likely that a DTMF tone is present in the frame.

2. The method of claim 1, wherein the step of detecting a DTMF tone in the frame comprises performing the Goertzel algorithm on the frame with a plurality of different frequencies so as to detect a pair of DTMF frequencies in the frame.

3. The method of claim 2, wherein, when a first frame is detected as having a DTMF tone present, performing the Goertzel algorithm on a second frame immediately following the first frame only using the frequencies of the DTMF tone that was detected in the first frame.

4. The method of claim 1, wherein the step of determining the likelihood of the presence of a DTMF tone is adapted for determining the likelihood of the presence of a DTMF tone in a first selection of the frames, and further comprising: determining, when the presence of a DTMF tone was determined amongst the first selection of frames, the presence of a DTMF tone in a further selection of the frames; and confirming the presence of a valid DTMF tone where the number of consecutive frames in which DTMF tones were determined as being present exceeds a predetermined number.

5. The method of claim 4, wherein the predetermined number of frames is three and wherein the duration of the predetermined number of frames is greater or equal to 40 ms.

6. The method of claim 4, wherein the first selection of frames comprises every third frame of the input signal.

7. The method of claim 4, wherein the second selection of frames comprises the three previous frames.

8. A telecommunications system arranged to operate in accordance with a DTMF detection method according to claim 1.

9. A method of detecting a dual tone multi-frequency (DTMF) tone in an input signal, wherein the input signal comprises a plurality of frames, comprising: calculating the energy level of a first portion of a frame; determining, using the calculated energy level, the likelihood that a DTMF tone is present in the frame; and where it is determined that it is likely that a DTMF tone is present in the frame, performing the Goertzel algorithm on the frame with a plurality of different frequencies so as to detect a pair of DTMF frequencies in the frame.

10. A method of detecting a dual tone multi-frequency (DTMF) tone in an input signal, wherein the input signal comprises a plurality of frames, comprising: calculating the energy level of a first portion of a current frame; determining, using the calculated energy level, the likelihood that a DTMF tone is present in the current frame; and where it is determined that a DTMF tone was present in the previous frame, and additionally where it is determined that it is likely that a DTMF tone is present in the current frame, performing the Goertzel algorithm on the current frame using only the frequencies of the DTMF tone that was detected in the previous frame.

11. The method of claim 9, wherein the step of determining the likelihood of the presence of a DTMF tone is adapted for determining the likelihood of the presence of a DTMF tone in a first selection of the frames, and further comprising: determining, when the presence of a DTMF tone was determined amongst the first selection of frames, the presence of a DTFM tone in a further selection of the frames; and confirming the presence of a valid DTMF tone where the number of consecutive frames in which DTMF tones were determined as being present exceeds a predetermined number.

12. The method of claim 10, wherein the step of determining the likelihood of the presence of a DTMF tone is adapted for determining the likelihood of the presence of a DTMF tone in a first selection of the frames, and further comprising: determining, when the presence of a DTMF tone was determined amongst the first selection of frames, the presence of a DTFM tone in a further selection of the frames; and confirming the presence of a valid DTMF tone where the number of consecutive frames in which DTMF tones were determined as being present exceeds a predetermined number.

13. Apparatus for detecting a dual tone multi-frequency (DTMF) tone in an input signal, wherein the input signal comprises a plurality of frame, comprising: a calculation element for calculating the energy level of a first portion of a frame; a processing element for determining, using the calculated energy level, the likelihood that a DTMF tone is present in the frame; and a detection element for detecting a DTMF tone in the frame when it is determined that it is likely that a DTFM tone is present in the frame.

14. The apparatus of claim 13, wherein the detection element is adapted for performing the Goertzel algorithm on the frame with a plurality of different frequencies so as to detect a pair of DTMF frequencies in the frame.

15. The apparatus of claim 14, wherein the detection element is further adapted for, when a first frame is detected as having a DTMF tone present, performing the Goertzel algorithm on a second frame immediately following the first frame using only the frequencies of the DTMF tone that was detected in the first frame.

16. The apparatus of claim 15, wherein the processing element is adapted for determining the likelihood of the presence of a DTMF tone in a first selection of the frames, and is further adapted for: determining, when the presence of a DTMF tone was determined amongst the first selection of frames, the presence of a DTMF tone in a further selection of the frames; and confirming the presence of a valid DTMF tone where the number of consecutive frames in which the DTMF tones were determined as being present exceeds a predetermined number.

17. An article of manufacture comprising a program storage medium having computer readable program code means embodied therein for performing a method of detecting a dual tone multi-frequency (DTMF) tone in an input signal, wherein the input signal comprises a plurality of frames, the computer readable program code means in the article of manufacture including: computer readable program code means for causing a computer to calculate the energy level of a first portion of a frame; computer readable program code means for causing a computer to determine, using the calculated energy level, the likelihood that a DTMF tone is present in the frame; and computer readable program code means for causing a computer to detect a DTMF tone in the frame when it is determined that it is likely that a DTMF tone is present in the frame.

18. The article of manufacture of claim 17, wherein the computer readable code means further includes: computer readable program code for causing a computer to determine the likelihood of the presence of a DTMF tone in a first selection of the frames, computer readable program code for causing a computer to determine, when the presence of a DTMF tone was determined amongst the first selection of frames, the presence of a DTMF tone in a further selection of the frames; and computer readable program code for causing a computer to confirm the presence of a valid DTMF tone where the number of consecutive frames in which DTMF tones were determined as being present exceeds a predetermined number.

19. A telecommunications system arranged to operate in accordance with a DTMF detection method according to claim 3.

20. A telecommunications system arranged to operate in accordance with a DTMF detection method according to claim 4.

* * * * *

UNITED STATES PATENT AND TRADEMARK OFFICE
CERTIFICATE OF CORRECTION

PATENT NO. : 7,184,542 B2  Page 1 of 1
APPLICATION NO. : 10/359628
DATED : February 27, 2007
INVENTOR(S) : Pierre Sauvage et al.

It is certified that error appears in the above-identified patent and that said Letters Patent is hereby corrected as shown below:

On Title Page, Item -73- should read,
The correct name of the Assignee is HEWLETT-PACKARD DEVELOPMENT COMPANY, L.P.

Signed and Sealed this

Twenty-seventh Day of May, 2008

JON W. DUDAS
*Director of the United States Patent and Trademark Office*